United States Patent [19]

Paar

[11] Patent Number: 4,711,937
[45] Date of Patent: Dec. 8, 1987

[54] SELF-CROSSLINKING PAINT BINDERS AND PROCESS FOR THEIR MANUFACTURE

[75] Inventor: Willibald Paar, Graz, Austria

[73] Assignee: Vianova Kunstharz, A.G., Graz, Austria

[21] Appl. No.: 942,829

[22] Filed: Dec. 17, 1986

[30] Foreign Application Priority Data

Dec. 20, 1985 [AT] Austria .................................. 3695/85

[51] Int. Cl.$^4$ .......................... C08G 8/28; C08L 61/08
[52] U.S. Cl. .................................... 525/489; 525/490; 525/528
[58] Field of Search ................................ 525/489, 490

[56] References Cited

U.S. PATENT DOCUMENTS 2,771,453 11/1956 De Groote et al. ................. 525/489
2,771,454 11/1956 De Groote et al. ................. 525/489
3,436,373 4/1969 Cox et al. ............................. 525/490
3,931,110 1/1976 Freeman et al. ..................... 525/490
4,086,292 4/1978 Kempter et al. ..................... 525/482
4,134,932 1/1979 Kempter et al. ..................... 525/481

Primary Examiner—John C. Bleutge
Assistant Examiner—Robert E. L. Sellers, II
Attorney, Agent, or Firm—A. W. Breiner

[57] ABSTRACT

Self-crosslinking paint binders, particularly for the formulation of water-dilutable, cathodically depositable paints (CED-paints), are obtained through reaction of formaldehyde with the reaction product of aminoalkylation products of phenols carrying at least one NH-group and semi-blocked diisocyanates and their subsequent reaction with epoxy compounds. The binders, when cathodically deposited, cure rapidly at low stoving temperatures to provide hard, solvent-resistant coatings.

10 Claims, No Drawings

SELF-CROSSLINKING PAINT BINDERS AND PROCESS FOR THEIR MANUFACTURE

FIELD OF INVENTION

This invention is concerned with self-crosslinking paint binders. More particularly, the invention is directed to self-crosslinking paint binders which are particularly suited for the formulation of water-dilutable cathodically depositable paints (CED-paints), and to a process for their manufacture.

BACKGROUND AND PRIOR ART

In commonly assigned Paar et al application Ser. No. 887,934 filed July 22, 1986, epoxy resin phenol reaction products are described which are theorized to have the following structure:

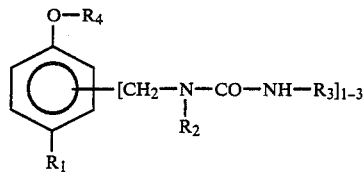

wherein
$R_1$ is a hydrogen atom, an alkyl, aryl or aralkyl radical or a corresponding phenol radical which optionally also contains 1 or 2 [—$CH_2$—N($R_2$)—CO—NH—$R_3$] radicals,
$R_2$ is the moiety of a compound carrying one primary amino group which has been reacted with a phenol by an aminoalkylation reaction,
—CO—NH—$R_3$ is the moiety of a semi-blocked diisocyanate such as toluene diisocyanate, and
$R_4$ is the moiety of an epoxy compound reacted with a phenolic hydroxy group.

It has now been found that the properties of the binders of the aforesaid co-pending application, particularly with respect to crosslinking activity, solubility of the partial protonation products as well as the film formation on electrophoretic deposition can be further improved if the resins, prior to the reaction of the phenolic hydroxy groups with the epoxy compound, are reacted with formaldehyde. It has been established that these reaction products add formaldehyde not only on the reactive sites of the phenol, but also on the urea groups formed through the reaction with the semi-blocked diisocyanate.

PRIMARY OBJECTS AND GENERAL DESCRIPTION OF INVENTION

The present invention, therefore, is concerned with the preparation of water-dilutable, self-crosslinking paint binders based on epoxy resin phenol reaction products, characterized in that reaction products of semi-blocked diisocyanates and aminoalkylation products of phenols carrying at least one NH-group are reacted at 50° to 90° C. with formaldehyde and subsequently with an epoxy compound which may be a monoepoxy compound or a polyfunctional polyepoxy compound, optionally partially defunctionalized with mono- or polycarboxy compounds. The maximum quantity of formaldehyde used is an amount corresponding to the number of formaldehyde-reactive sites on the phenol and the urea groups, respectively. The maximum number of epoxy groups on the epoxy compound used corresponds to the sum of phenolic hydroxy groups and methylol groups formed through the reaction with formaldehyde. The basic groups which are present on the reaction product, preferably as tertiary amino groups, correspond to an amine value of at least 30 mg KOH/g.

Further, the invention relates to the binder products produced according to the process of this invention and to the use of the binder products in paints, particularly for cathodic electrodeposition paints.

The aminoalkylation products of phenols suitable for the process of the invention are produced according to methods known from the published literature such as Houben-Weyl, *Methods of Organic Chemistry*, Vol. XI/1 (1957). Suitable phenols for use in the process are phenol or substituted phenols such as monoalkylphenols, preferably those carrying an alkyl radical with at least 4 C-atoms. Representatives of this group are the o- or p-butylphenols and their higher homologues. Also, aryl phenols, such as phenylphenol or aralkylphenols, such as bisphenol A, can be used. The phenols are reacted in a first reaction step with equimolar quantities of a primary monoalkyl amine such as butylamine or its isomers and homologues and/or a primary alkanol amine such as monoethanol amine or its homologues, and/or a primary/tertiary alkyl diamine, such as a dialkylaminoalkylamine exemplified by dimethylaminoethylamine or diethylaminopropylamine and equimolar quantities of formaldehyde.

In a preferred embodiment the aminoalkylation is carried out by heating the components in the presence of a solvent which forms an azeotropic blend with water, such as toluol or a corresponding aliphatic hydrocarbon, to the temperature necessary for azeotropically removing the reaction water. After elimination of the calculated quantity of water, the solvent is vacuum-stripped and the reaction product is dissolved in an aprotic solvent. The reaction product thus obtained carrying an average of at least one secondary amino group in the molecule is reacted in a second reaction step at from 30° to 50° C. with a semi-blocked diisocyanate in a quantity corresponding to one mole isocyanate per each NH-group. The semi-blocked diisocyanates utilized herein are prepared as is conventional. The preferred diisocyanates are those wherein the NCO-groups have different reactivity, such as toluenediisocyanate or isophoronediisocyanate. The preferred blocking agents are aliphatic monoalcohols which are split off under stoving conditions, optionally in the presence of common catalysts. Examples of other blocking agents are phenols, oximes, amines, unsaturated alcohols, etc. Through the reaction of the NH-groups with the semi-blocked diisocyanates, the desired urea groups are formed. Because of the preferential reaction between the NH- and NCO-groups, the hydroxy groups which are formed remain substantially unreacted.

The structure of the resulting products is theorized to be as follows:

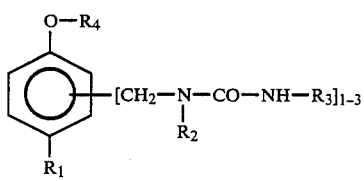

wherein
R$_1$ is a hydrogen atom, an alkyl, aryl or aralkyl radical or a corresponding phenol radical which optionally also contains 1 or 2 [—CH$_2$—N(R$_2$)—CO—NH—R$_3$] radicals, R$_2$ is the moiety of a compound carrying one primary amino group which has been reacted with a phenol by an aminoalkylation reaction, —CO—NH—R$_3$ is the moiety of a semi-blocked diisocyanate such as toluene diisocyanate, and R$_4$ is the moiety of an epoxy compound reacted with a phenolic hydroxy group.

Optionally, the aminoalkylation can be carried out with diprimary amines. Suitable diprimary amines are, in addition to the alkylene diamines such as ethylene diamine and its homologues, diamines having a carbon chain interrupted by ether groups or amino groups. Examples of suitable compounds of this type are 4,7-dioxadecane-1,10-diamine, 7-methyl-4,10-dioxatridecane-1,13-diamine, or polyoxyalkylene diamines of the formula—

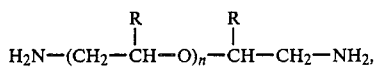

wherein R is H or CH$_3$ and n=1–30. Further, amines such as diethylene or dipropylene triamine or the polyoxypropylenetriamine or N,N'-bis-(3-amino-propyl)ethylene diamine can be used. When using higher functional amines, it is necessary, as will be evident to one skilled in the art, to choose the components and reaction conditions for the further course of reaction so as to avoid gelation of the reaction batch. In particular, with higher functional amines the quantity of the semi-blocked diisocyanate in the second reaction step has to be adapted to the number of NH-functional groups present.

The products obtained from the above reactions carry active hydrogen atoms at the phenolic structures as well as at the urea groups which will react with formaldehyde with the formation of methylol groups. In the process of the present invention, 20 to 100% of these hydrogen atoms are reacted in a third reaction step with formaldehyde. The intermediate products, optionally in the presence of suitable solvents such as diethyleneglycoldialkylether, ethyleneglycolmonoalkylether or alkoxypropanols, are reacted at 65° to 80° C., the formaldehyde preferably being used as paraformaldehyde. The reaction is carried to a point until the content of free formaldehyde has reached a constant value.

In a final or fourth reaction step, the reaction products of step three are reacted with an epoxy compound, phenolethers being formed. Preferred epoxy resins useful in the present invention have an epoxy equivalent weight of from about 50 to 2000, including the diepoxy resins based on epichlorohydrin and bisphenol A or polypropyleneglycol. Monoepoxy compounds such as the glycidylesters of monocarboxylic acids particularly those of the so-called KOCH-acids, as well as 2-ethylhexylglycidyl ethers, can be coemployed with the diepoxy resins. The reaction is carried out at from 90° to 130° C. until an epoxy value of practically zero is attained. Optionally, di- or polyepoxy resins can either be partially defunctionalized or lengthened through reaction with mono- or polycarboxylic compounds. Suitable monocarboxylic compounds for the reaction are the natural and synthetic fatty acids or semi-esters of dicarboxylic acids with aliphatic monoalcohols or hydroxyalkyl oxazolidines. The preferred polycarboxy compounds for the reaction are long-chain dicarboxylic acids such as dimeric fatty acids or carboxy group containing substantially linear polyesters. Another group of polycarboxy compounds which can be used are the adducts of maleic anhydride with long-chain polyene compounds such as butadiene polymers, the anhydride groups of the adducts having been opened through reaction with monoalcohols. The reaction of the carboxy compound with the diepoxy resin can be carried out prior to the reaction with the intermediate product obtained in step three, at 100° to 120° C., optionally in the presence of basic catalysts, to an acid value of below 3 mg KOH/g. The reaction of the epoxy compound with the carboxy compound can also be carried out simultaneously with the last or fourth process step. In this case, the intermediate product of step three, the carboxy compound, and the diepoxy resin are reacted at 90° to 120° C. to an epoxy value of practically zero.

In the formulation of the reaction batches, care should be taken in order that the final products have the necessary basicity to ensure an adequate stability of the aqueous solution of the binder. The introduction of the preferred tertiary amino groups responsible for this basicity, according to an amino value of 30 mg KOH/g, can be effected either through the use of primary-tertiary diamines in the aminoalkylation reaction or through the use of suitable amines as blocking agents for the semi-blocking of the diisocyanates.

In order to render the products water-dilutable, the basic groups of the reaction product are partially or totally neutralized with acids, preferably formic acid, acetic acid, or lactic acid. For a dilutability suitable for practical use it is sufficient to neutralize 20–60% of the basic groups or a quantity of about 20 to 60 millimoles of acid per 100 grams of resin solids. The binders are then diluted with deionized water to the desired concentration. Optionally the binders are processed as pigmented paints prior to neutralization or dilution, or in partially diluted condition with crosslinking catalysts, pigments, extenders, and other additives. The formulation of such paints and their processing in electrodeposition are known to one skilled in the art and are described in the literature.

Curing of the deposited films when used as primers is effected at 150° to 170° C. for a period of 10 to 30 minutes. If the binders are not sufficiently crosslinking per se, additional crosslinking agents such as blocked isocyanates, amine resins, or phenolic resins may be coemployed. With appropriate formulation the products may also be applied by dipping, roller coating, or spraying. Optionally the binders can also be processed with organic solvents.

The following examples illustrate the invention without limiting its scope. All quantities in parts or percentages refer to weight unless otherwise stated.

EXAMPLE 1

Step 1—In a suitable reaction vessel, 228 parts bisphenol A (1 mole) are heated with 260 parts diethylaminopropylamine (2 moles) and 66 parts paraformaldehyde, 91% (2 moles) in the presence of 131 parts toluol as azeotropic entraining agent at the azeotropic temperature until 42 parts of reaction water have formed.

Step 2—After cooling to 30° C., 608 parts (2.0 moles) of toluenediisocyanate semi-blocked with 2-ethylhexanol are added to the charge of Step 1 within 45 minutes. As soon as an NCO-value of substantially zero is reached, the batch is diluted with 152 parts diethyleneglycol dimethylether.

Step 3—1400 parts of the solution of Step 2 are reacted at 70° to 75° C. with 132 parts paraformaldehyde, 91% (4.0 moles) until the content of free formaldehyde remains practically constant.

Step 4—190 parts of an epoxy resin based on bisphenol A and epichlorohydrin (epoxy equivalent weight about 190), 186 parts 2-ethylhexylglycidylether and 300 parts methoxypropanol are added to the reaction product of Step 3 and reacted at 90° C. until the epoxy value has fallen to practically zero. The product is diluted with methoxypropanol to a solids content of 65%.

After addition of 0.6% (calculated as metal) of dibutyl tindilaurate and 20 millimoles formic acid per 100 grams resin solids, a 15% aqueous varnish is prepared. Cathodically deposited films, cured at 170° C. for 20 minutes, give a coating resistant to 200 double rubs with methylethylketone.

EXAMPLE 2

1400 parts of the solution obtained according to Step 2 of Example 1 are reacted at 70° to 75° C. with 116 parts paraformaldehyde, 91% (3.5 moles) for 4 hours. Then 1100 parts of a 70% solution of an epoxy resin (based on epichlorohydrin and bisphenol A, epoxy equivalent weight about 480) in methoxypropanol, 550 parts (2.2 moles) of a glycidyl ester of a $C_9$-$C_{11}$-tertiary monocarboxylic acid and 116 parts (0.2 moles) of a dimeric fatty acid (acid value 186–194 mg KOH/g; viscosity 3900 mPa.s/25° C.; dimer content at least 75%; trimer content at least 20%) are added, and the reaction is carried on at 90° to 95° C. until all epoxy groups have been consumed. The reaction product is diluted to 60% solids with methoxypropanol.

After addition of 20 millimoles formic acid per 100 grams resin solids and 0.6% (calculated on metal) of dibutyl tindilaurate, the resin is diluted with deionized water to a solids content of 15% to form a clear varnish. Zinc-phosphated steel panels are cathodically coated with this clear varnish, and the films cured for 20 minutes at 160° C. Hard films result with a methylethylketone resistance of at least 150 double rubs.

As will be apparent to one skilled in the art, various modifications can be made within the scope of the aforesaid description. Such modifications being within the ability of one skilled in the art form a part of the present invention and are embraced by the appended claims.

It is claimed:

1. Self-crosslinking cationic paint binders water-dilutable upon protonation comprising the reaction product of components A-B and C wherein component A-B is the reaction product of (A) an amino alkylation product carrying an average of at least one NH-group per molecule of a phenol compound, an amino compound selected from the group consisting of a primary alkylamine, a primary alkanolamine, and an alkylenediamine, and formaldehyde subsequently reacted with a semi-blocked diisocyanate; and (B) formaldehyde wherein said formaldehyde is reacted with (A) in a maximum quantity corresponding to the number of formaldehyde reactive hydrogen sites on the phenol and urea groups of (A), and wherein component C is an epoxy compound having an epoxy equivalent weight of from about 50 to 2000, and wherein the quantity of component C is selected so that the maximum number of epoxide groups available corresponds to the sum of phenolic hydroxy groups and the methylol groups formed through the reaction with formaldehyde, said binder having basic amino groups corresponding to an amine value of at least 30 mg KOH/g.

2. The binder according to claim 1 wherein from about 20 to 100% of the formaldehyde reactive hydrogen sites present in reaction product (A) are reacted with formaldehyde.

3. The binder according to claim 2 wherein in component A-B the phenol compound is a monoalkylphenol.

4. The binder according to claim 2 wherein in component A-B the phenol compound is monoarylphenol.

5. The binder according to claim 2 wherein in component A-B the phenol compound is aralkylphenol.

6. The binder according to claim 2 wherein in component A the semi-blocked diisocyanate is toluene diisocyanate blocked with an aliphatic monoalcohol.

7. The binder according to claim 2 wherein the epoxy compound is a diepoxide.

8. The binder according to claim 2 wherein the amines of component A are diprimary alkylamines used in combination with a primary-tertiary alkylamine.

9. The binder according to claim 2 wherein the epoxide compound of component C is an epoxy resin modified with a mono- or dicarboxylic compound.

10. Cathodically depositable paints incorporating the binders of claim 1.

* * * * *